UNITED STATES PATENT OFFICE.

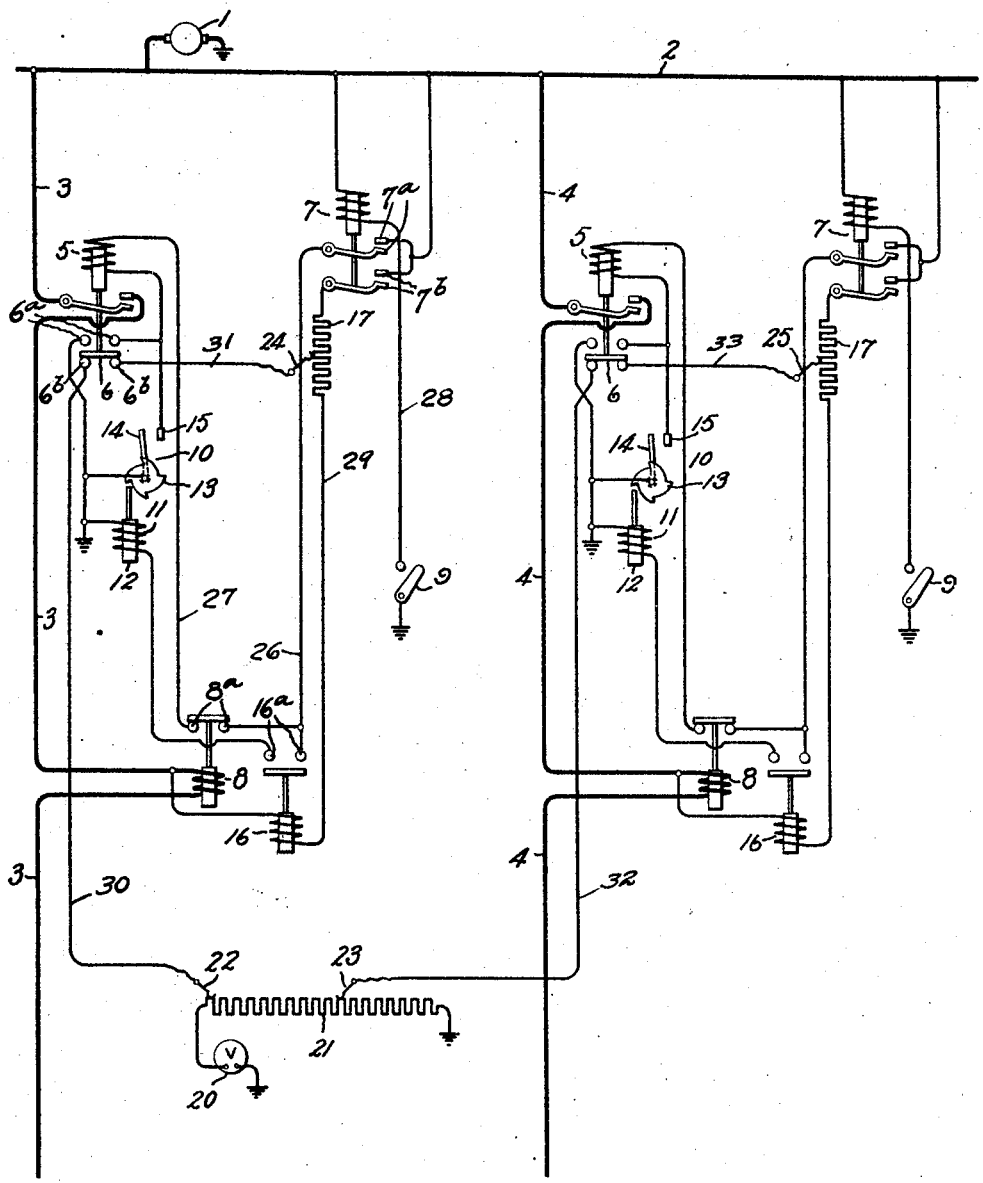

CLAUDE W. PLACE, OF LA GRANGE, ILLINOIS, ASSIGNOR TO GENERAL ELECTRIC COMPANY, A CORPORATION OF NEW YORK.

SYSTEM OF ELECTRICAL DISTRIBUTION.

1,420,385.  Specification of Letters Patent.  Patented June 20, 1922.

Application filed March 19, 1920. Serial No. 367,241.

*To all whom it may concern:*

Be it known that I, CLAUDE W. PLACE, a citizen of the United States, residing at La Grange, in the county of Cook, State of Illinois, have invented certain new and useful Improvements in Systems of Electrical Distribution, of which the following is a specification.

My invention relates to systems of electrical distribution and especially to such systems as are adapted to supply power from a common source, such as a distributing busbar to a plurality of distribution circuits, such as the feeder circuits of an electrical railway system.

One object of my invention is to provide in a system in which a plurality of distribution circuits are supplied with energy from a common source an arrangement whereby the connection between a distribution circuit and the common source is changed upon the occurrence of an excessive demand upon said circuit, in such a manner that the current in the overloaded circuit is materially reduced, thereby preventing the voltage of the common source and the other distribution circuits being reduced due to the excessive demand on the overloaded circuit.

It is also an object of my invention to provide an arrangement whereby the normal connection between the overloaded distribution circuit and the common source can be quickly restored after the cause of the excessive demand has been corrected.

In accordance with my invention, I provide means whereby an excessive demand upon a distribution circuit causes a current limiting device, such as a resistance to be inserted between the common source and the overloaded distribution circuit, and whereby the normal connection between the distribution circuit and the common source is automatically restored after the cause of the excessive demand has been removed and a certain number of predetermined variations in an electrical condition of the circuit, such as the current traversing said circuit, have been produced.

My invention will be more readily understood from the following description taken in connection with the accompanying drawing which is a diagrammatic view of an electrical distribution system embodying my invention.

Referring to the drawing, a source of electrical energy 1 is arranged to supply power to a distributing bus bar 2. The source of energy may be either alternating current or direct current, but since the invention is especially adapted to distribution systems for electric railway systems which are usually direct current having one side connected to ground, I have shown the source of energy as a direct current generator having one terminal connected to ground and the other terminal connected to the distributing bus bar 2. It is to be understood, however, that any other source of direct current may be employed.

The distributing bus bar 2 is adapted to be connected to a plurality of distribution circuits, two of which I have shown and designated by the numerals 3 and 4. Each distribution circuit is adapted to be connected directly to the distributing bus bar by any suitable switching means. I have shown contactors 5 for accomplishing this result. Each contactor 5 is provided with an auxiliary switch 6 which is adapted to complete a holding circuit for the coil of the contactor 5 when in its closed position. Each of these holding circuits extends from the bus bar 2 through the contacts 7ª of a contactor 7, conductor 26, contacts 8ª of an overload relay 8 which is inserted in series with the distribution circuit, conductor 27, coil of the contactor 5, contacts 6ª of the auxiliary switch 6 to ground. The coil of each contactor 7 is connected between the bus bar 2 and ground and is controlled by a switch 9, so that the contactor can be opened and closed at will. The purpose of this switch is to provide means for permanently disconnecting the distribution circuit associated therewith from the bus bar 2.

When a contactor 5 is open, the above traced circuit for energizing the coil of this contactor is controlled by a device 10 which is adapted to close the circuit after it has been operated a predetermined number of times. This device may be of any suitable construction for accomplishing this result, the particular device shown in the drawing being a notching relay which comprises a coil 11, a plunger 12 adapted to be operated by the coil 11, a ratchet wheel 13 adapted to be engaged by the plunger 12 and moved the distance of one tooth each time the coil 11 is energized, a movable contact 14 carried by the ratchet wheel 13, and a stationary contact 15 adapted to be engaged by the movable contact 14 after the coil 11 has been energized a predetermined number of times. In the particular device shown, the movable contact 14 is adapted to engage the stationary contact 15 every fourth time that the coil 11 is energized. The circuit of the coil 11 extends from the bus bar 2 through the contacts 7ª of the contactor 7, conductor 26, contacts 16ª of a relay 16, coil of the relay 11 to ground. The relay 16 and a current limiting means, such as a resistance 17, are connected in series with each other and in shunt around the contacts of a contactor 5 so that whenever the contactor 5 is opened a circuit is completed from the bus bar 2 through the contacts 7ᵇ of the contactor 7, the resistance 17 and the coil of the relay 16 to the distribution circuit with which the contactor 5 is associated. Each resistance 17 is preferably of such a high value that only a very small current flows through it to the distribution circuit when the contactor 5 is open and a short circuit exists upon the distribution circuit associated therewith. Each relay 16 is designed so that it will operate to complete a circuit through its contacts 16ª only when a predetermined current flows through its coil due to a predetermined demand existing on the distribution circuit while the contactor 5 is open.

20 represents any suitable indicating device, the particular device shown being a volt-meter. This volt-meter is preferably situated at a place where it is desired to have an indication showing which particular distribution circuit is in trouble, and where on said circuit the trouble is. Such a place for instance, would be in the building where the repair crew is located. One terminal of this volt-meter 20 is connected to ground, and the other terminal is connected to one end of a resistance 21 the other end of which is connected to ground. The resistance 21 is provided with a plurality of taps, there being as many taps as there are distribution circuits supplied with power from the distribution bus bar 2. Therefore in the arrangement illustrated, I have shown two taps 22 and 23. The tap 22 is adapted to be connected to a tap 24 of the resistance 17 associated with the distribution circuit 3 by means of the conductor 30, the contacts 6ᵇ of the auxiliary switch 6 associated with this circuit and conductor 31. The tap 23 is adapted to be connected to a tap 25 of the resistance 17 associated with the distribution circuit 4 by means of the contactor 32, the contacts 6ᵇ of the auxiliary switch 6 associated with this distribution circuit and conductor 33. Since a different amount of resistance is connected in series with the volt-meter 20 when the contactor 5, associated with the distribution circuit 3, is open than when the contactor 5, associated with the distribution circuit 4, is open, the voltages impressed upon the volt-meter 20 are different. Furthermore, when the cause of the excessive demand on the circuit in trouble is a short circuit, the short circuit current will depend upon the line drop, which in turn depends upon the distance between the bus-bar 2 and the point where the short circuit exists. The voltage drop across that portion of the resistance 17 associated with the circuit in trouble and connected in series with the volt-meter 20, therefore, depends upon the distance between the bus-bar 2 and the point where the trouble is. Since this voltage drop controls the voltage impressed upon the volt-meter 20 it is evident that the magnitude of the indication of the volt-meter is also affected by the distance between the bus-bar 2 and the point where the trouble is. By selecting the proper resistance values and calibrating the volt-meter 20, it is evident that magnitude of volt-meter reading will indicate which particular distribution circuit is in trouble, and where on said circuit the cause of the trouble is.

The operation of the system shown is as follows: Let it be assumed that all the switches 9 are closed and that the movable contacts 14 of the notching relays 10 are in engagement with their respective stationary contacts 15. Contactors 5 and 7, are, therefore, closed and the distribution circuits 3 and 4 are connected directly to the bus-bar 2. As long as the demand on either of the distribution circuits remains below a predetermined value these connections remain unchanged.

As soon as an abnormal demand, such as a short circuit, occurs on one of the distribution circuits, the overload relay 8 associated with that circuit operates to open the circuit of the coil of the contactor 5 controlled by the contacts 8ª. Let it be assumed that the short circuit occurs upon the distribution circuit 3. Upon the operation of the overload relay associated with the distribution circuit 3 the contactor 5 opens and removes the short circuit from around the circuit containing the relay 16, the resistance 17 and the contacts 7ᵇ. Since the high resistance 17 is inserted in series with the distribution circuit 3, the current demand upon the distribution circuit 3 is decreased to such a small value that the voltage supplied to the other distribution circuits is not affected by the short circuit on the distribution circuit 3. The current which flows through the relay 16 is sufficient to operate the relay to close the above traced circuit of coil 11 of the notching relay 10. The energization of the coil 11 causes the plunger 12 to engage the ratchet wheel 13 and move it the distance of one tooth thereby moving the movable contact 14 out of engagement with the stationary contact 15.

When the contactor 5 opens the contacts 6ᵇ of the auxiliary switch 6 completes a circuit for the volt-meter 20 from the bus bar 2 through the contacts 7ᵇ, the tap 24 of the resistance 17, conductor 31, contacts 6ᵇ, conductor 30, tap 22 of the resistance 21, voltmeter 20 to ground, thereby causing the voltmeter to indicate which distribution circuit is in trouble and approximately where on said circuit the trouble is. As long as the cause of the excessive demand remains connected to the distribution circuit, the relay 16 remains energized.

If the person who repairs the distribution circuit in trouble, first connects an auxiliary short circuit to the distribution circuit, he then can make any necessary repairs without any danger to himself and without any possibility of the auxiliary short circuit being directly connected to the bus-bar 2, because as long as the short circuit remains connected to the distribution circuit, the relay 16 remains energized and prevents the notching relay 10 from being operated. After the circuit has been repaired, the repair man connects the circuit directly to the bus-bar 2 by merely opening and closing the auxiliary short circuit a plurality of times. Each time the short circuit is opened relay 16 deenergizes and each time the short circuit is closed the relay 16 becomes energized and closes the circuit for the coil 11 of the notching relay to move the ratchet wheel 13 the distance of one tooth. After the predetermined number of these current variations have been produced, the movable contact 14 engages the stationary contact 15 and completes the above traced circuit through the coil of the contactor 5 to close the contactor, thereby connecting the distribution circuit 3 directly to the bus-bar 2 and restoring the system to its original condition.

For completing the auxiliary short circuit the repair man may be provided with a bank of lamps which he connects between the distribution circuit and ground, and a circuit breaker connected in parallel therewith. While making the repairs he has the circuit breaker closed. After completing the repairs he opens and closes the circuit breaker a number of times until the brilliancy of the lamps indicates that full voltage has been applied to the distribution circuit.

If desired, the system may be designed so that when the excessive demand is due to a ground which momentarily short circuits the distribution circuit and then clears itself, the necessary current variations in the distribution circuit for operating the relay 16 may be produced by motormen moving their controllers to the first notch and off again a number of times. After a predetermined number of current variations have been produced in this manner the contactor 5 is closed to connect the distribution circuit directly to the bus-bar 2.

In case an excessive demand occurs upon the distribution circuit 4, the contactor 5 associated therewith is opened and a circuit completed for the volt-meter 20 through the tap 23 of the resistance 21 and tap 25 of the resistance 17 associated with this distribution circuit. The volt-meter 20 now indicates that the distribution circuit 4 is in trouble and approximately where, on said circuit, the trouble is. After the trouble has been corrected, and the notching relay 10, associated with the distribution circuit 4, has been operated a predetermined number of times, the distribution circuit 4 is again directly connected to the bus-bar 2.

I conceive that various modifications of my invention may be made, and I accordingly do not desire to be limited to the exact arrangement herein described and shown, but seek to cover in the appended claims all such modifications and arrangements which come within the scope and spirit of my invention.

What I claim as new and desire to secure by Letters Patent of the United States, is:—

1. In a system of electrical distribution, a source of electrical energy, a distribution circuit, switching means for connecting said distribution circuit directly to said source, current limiting means adapted to be inserted in said distribution circuit while said switching means is open, means responsive to an excessive demand on said distribution circuit for effecting the operation of said switching means to insert said current limiting means in said distribution circuit, and means automatically operated after a predetermined condition of said distribution circuit has occurred a predetermined number of times after said current limiting means is inserted therein for effecting the operation of said switching means to connect said distribution circuit directly to said source.

2. In a system of electrical distribution, a source of electrical energy, a distribution circuit, switching means for connecting said distribution circuit directly to said source, current limiting means adapted to be inserted in said distribution circuit while said switching means is open, means responsive to an excessive demand on said distribution circuit for effecting the operation of said switching means to insert said current limiting means in said distribution circuit, and means automatically operated in response to a predetermined number of predetermined variations in the current through said distribution circuit after said current limiting means is inserted therein for effecting the operation of said switching means to connect said distribution circuit directly to said source.

3. In a system of electrical distribution, a source of electrical energy, a distribution circuit, an electrically operated switch for connecting said distribution circuit directly to said source, current limiting means adapted to be inserted in said distribution circuit while said switch is open, an overload relay associated with said distribution circuit and adapted to control a circuit of said switch to effect the opening of said switch, and a notching relay controlled by predetermined current variations in said distribution circuit when said switch is open for controlling a circuit of said switch to effect the closing of said switch after said current variations have occurred a predetermined number of times.

4. In a system of electrical distribution, a source of electrical energy, a distribution circuit, a contactor for connecting said distribution circuit directly to said source, a high resistance adapted to be inserted in said distribution circuit while said contactor is open, an overload relay connected in said distribution circuit and adapted to open the circuit of said contactor, and a notching relay controlled by predetermined current variations in said distribution circuit when said switch is open and adapted to close the circuit of said contactor after said current variations have occurred a predetermined number of times.

5. In a system of electrical distribution, a source of electrical energy, a distribution circuit, a contactor for connecting said distribution circuit directly to said source, a high resistance adapted to be inserted in said distribution circuit while said contactor is open, a current responsive device in series with said high resistance and adapted to be operated in response to a predetermined variation in the current traversing said distribution circuit after said switch is opened, an overload relay connected in said distribution circuit and adapted to open the circuit of said contactor, and a notching relay controlled by the operation of said current responsive device and adapted to close the circuit of said contactor after said current responsive device has been operated a predetermined number of times.

6. In a system of electrical distribution, a source of electrical energy, a plurality of distribution circuits, switching means associated with each distribution circuit for connecting said circuits directly to said source, current limiting means adapted to be inserted in a distribution circuit while the switching means associated therewith is open, means responsive to an abnormal demand on a distribution circuit for effecting the opening of the switching means associated therewith, means automatically operated after a predetermined condition of a circuit has occurred a predetermined number of times after the switching means associated therewith is opened for effecting the operation of said switching means to connect said circuit directly to said source, and indicating means controlled by said switching means and arranged to indicate upon which circuit and where upon said circuit the excessive demand exists.

7. In a system of electrical distribution, a source of electrical energy, a plurality of distribution circuits, switching means associated with each distribution circuit for connecting said circuits directly to said source, a current limiting resistance associated with each distribution circuit and adapted to be inserted in the distribution circuit while the switching means associated therewith is open, means responsive to an abnormal demand on a distribution circuit for effecting the opening of the switching means associated therewith, means automatically operated after a predetermined condition of said circuit has occurred a predetermined number of times after the switching means associated therewith is opened for effecting the closing of said switching means to connect said circuit directly to said source, indicating means, and a plurality of circuits for said indicating means controlled by said switching means, each circuit being controlled by a different one of said switching means and having connected therein a predetermined portion of the resistance associated with the switching means which controls the circuit.

8. In a system of electrical distribution, a source of electrical energy, a plurality of distribution circuits, switching means associated with each distribution circuit for connecting said circuits directly to said source, a current limiting resistance associated with each distribution circuit and adapted to be inserted in the distribution circuit while the switching means associated therewith is open, means responsive to an abnormal demand on a distribution circuit for effecting the opening of the switching means associated therewith, means automatically operated after a predetermined condition of said circuit has occurred a predetermined number of times after the switching means associated therewith is opened for effecting the operation of said switching means to connect said circuit directly to said source, indicating means, a resistance provided with a plurality of taps, and a circuit for said indicating means having a plurality of branches, each branch extending from a different tap of said resistance and being controlled by a different one of said switching means and including therein a predetermined portion of the resistance associated with the switching means which controls the branch.

In witness whereof, I have hereunto set my hand this 15th day of March, 1920.

CLAUDE W. PLACE.